(12) United States Patent
Sieczka et al.

(10) Patent No.: US 7,145,703 B2
(45) Date of Patent: Dec. 5, 2006

(54) LOW PROFILE HOLOGRAPHIC SIGHT AND METHOD OF MANUFACTURING SAME

(75) Inventors: Eric J. Sieczka, Ann Arbor, MI (US);
Anthony M. Tai, Northville, MI (US);
Robert H. Fish, Howell, MI (US)

(73) Assignee: EOTech Acquisition Corp., Ann Arbor, MI (US)

( * ) Notice: Subject to any disclaimer, the term of this patent is extended or adjusted under 35 U.S.C. 154(b) by 56 days.

(21) Appl. No.: 11/044,799

(22) Filed: Jan. 27, 2005

(65) Prior Publication Data

US 2006/0164704 A1 Jul. 27, 2006

(51) Int. Cl.
*G02B 5/32* (2006.01)

(52) U.S. Cl. ............... 359/15; 42/130; 42/131; 42/132; 356/247

(58) Field of Classification Search ........ 359/1, 359/15; 42/130–132; 356/247, 252
See application file for complete search history.

(56) References Cited

U.S. PATENT DOCUMENTS

| | | | |
|---|---|---|---|
| 5,283,689 A | 2/1994 | Carlough | |
| 5,383,278 A | 1/1995 | Kay | |
| 5,483,362 A * | 1/1996 | Tai et al. | 359/1 |
| 5,815,936 A * | 10/1998 | Sieczka et al. | 42/115 |
| 5,901,452 A | 5/1999 | Clarkson | |
| 6,022,126 A | 2/2000 | Sekine et al. | |
| 6,041,508 A | 3/2000 | David | |
| 6,373,628 B1 | 4/2002 | Gunnarsson et al. | |
| 6,490,060 B1 * | 12/2002 | Tai et al. | 359/15 |
| 6,640,482 B1 | 11/2003 | Carlson | |
| 6,807,742 B1 | 10/2004 | Schick et al. | |

* cited by examiner

*Primary Examiner*—Leonidas Boutsikaris
(74) *Attorney, Agent, or Firm*—Brooks Kushman P.C.

(57) ABSTRACT

A low profile holographic sight includes a base having a mounting mechanism and a body mounted on the base for housing a laser diode, an associated electronic control and power source, and optical elements including a collimator, a transmission image hologram of the reticle pattern, and a reflective diffraction grating, wherein the optical elements are arranged within the body to direct and fold the laser beam in a substantially generally horizontal path, and is insensitive to drift in laser wavelength. The optical elements superimpose an image of the reticle pattern over the direct view of the target scene in a generally parallel and close relationship with the barrel of a firearm, such as a shotgun or a rifle, upon which the sight is mounted.

11 Claims, 5 Drawing Sheets

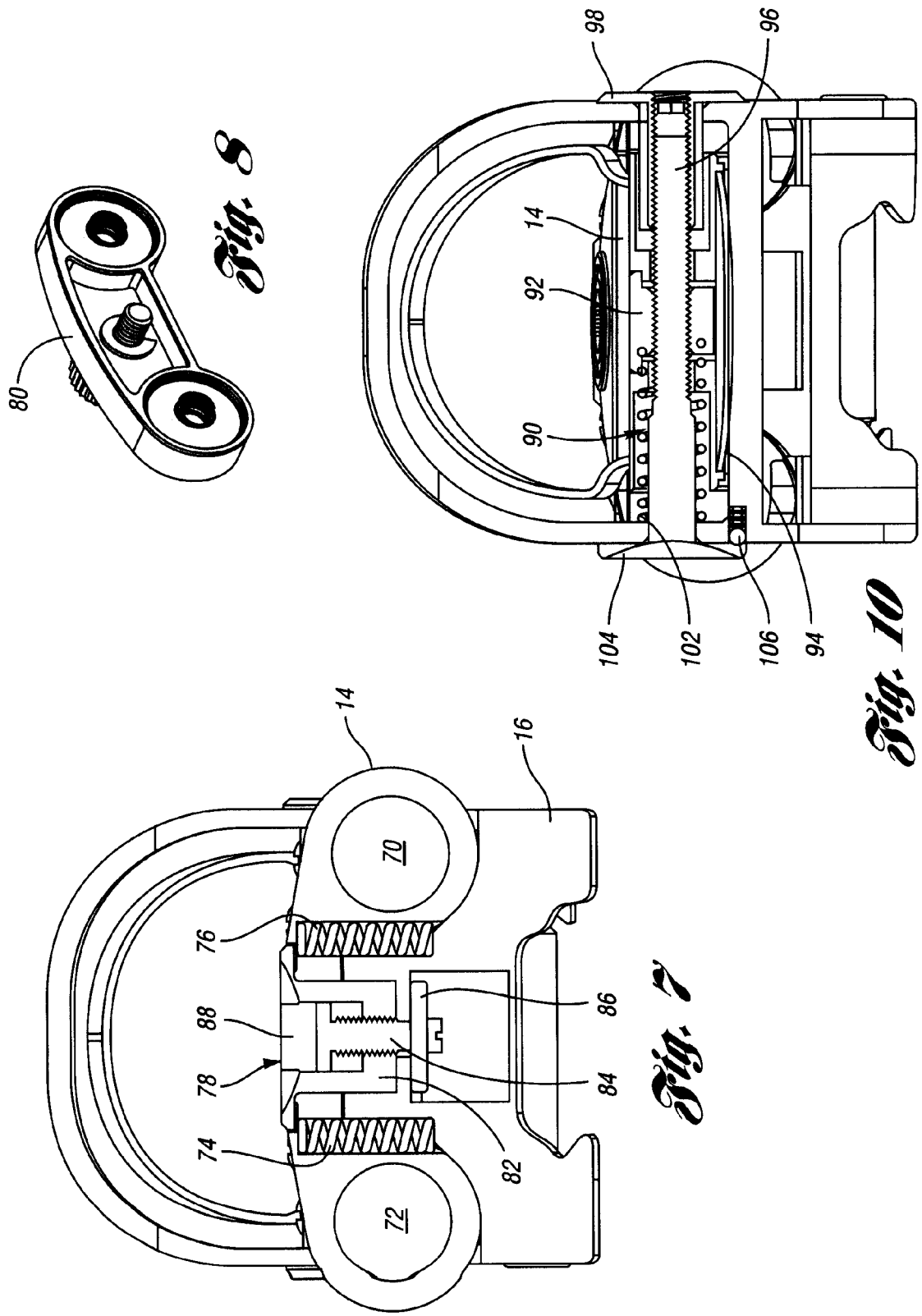

LOW PROFILE HOLOGRAPHIC SIGHT AND METHOD OF MANUFACTURING SAME

BACKGROUND OF THE INVENTION

1. Field of the Invention

This invention relates to low profile holographic sights for firearms.

2. Background Art

There are several types of sights utilized with firearms, such as rifles, shotguns, handguns and other hand-held weapons, such as bows, including sights which including holographic images of one, two, or three dimensional reticle patterns.

U.S. Pat. No. 5,483,362, issued to Tai et al., describes a sight that is relatively compact.

U.S. Pat. No. 5,815,936, issued to Sieczka et al., discloses a detachable hologram assembly and windage/elevation adjustment mechanism for such a sight.

U.S. Pat. No. 6,490,060, issued to Tai et al., discloses another lightweight compact sight that has a relatively shorter profile, which is particularly advantageous for mounting and use with smaller handguns and some bows. Various embodiments of the holographic sights disclosed in these patents have been sold in the commercial market as the Bushnell® HOLO-SIGHT®D. It is desirable to manufacture a holographic sight that has a lower profile, which is particularly advantageous for mounting and use on a rifle or shotgun. It is also desirable to reduce both the cost of the components of the sight as well as reduce the cost associated with manufacturing the sight.

SUMMARY OF THE INVENTION

In carrying out the above and other objectives, the low profile holographic sight of the present invention includes a base having a mounting mechanism and a body mounted on the base for housing a laser diode, an associated electronic control and power source, and optical elements including a collimator, a transmission image hologram of a reticle pattern, and a reflective diffraction grating, wherein the optical elements are arranged within the body to direct and fold the laser beam in a substantially generally horizontal path to thereby superimpose an image of the reticle pattern over the direct view of the target scene in a generally parallel and close relationship with the barrel of a firearm, such as a shotgun or a rifle, upon which the sight is mounted.

The sight of the present invention is relatively lower profile due to the above described arrangement of the optical elements. The light path is projected parallel to, and a relatively short vertical distance from, the barrel of the firearm shotgun or rifle, which provides a sight line approximating other traditional gun sights found on shotguns and rifles.

The invention also preferably includes adjustment mechanisms which rotate the entire body of the sight relative to the base (and, thus, relative to the firearm) to thereby adjust the projected reticle pattern for windage and elevation. The adjustment mechanism includes a windage adjuster which displaces the body relative to the base in a generally horizontal direction by pivoting the body relative to the base about a generally vertical axis, and an elevation adjuster which displaces the body relative to the base in a vertical direction by pivoting the body about a generally horizontal axis. In one embodiment, the windage adjuster serves as the pivoting axis for the elevation adjuster, and vice versa.

In one embodiment the laser diode and its electronic control board are mounted on the body using conventional fasteners which are inserted into apertures in the board. These apertures are elongate in the direction parallel to the path of the light beam to allow for a linear adjustment of the board and, thus, the laser diode, in order to focus the reticle pattern. The connections which provide power from the battery to the laser control module include a pair of conductive elements which interconnect the power source and the control board via contact of each of the elements on a pair of conductive surfaces on the control board. As with the apertures, each of the conductive surfaces is elongate in the direction of the path of the light beam to allow for continuous contact of the conductive elements and connection of electrical power before, during and after any adjustment of the laser diode on the base when the laser is focused during assembly. Thus, each unit may be quickly and easily focused during assembly, taking up an tolerance error that arises from fabrication of the aspheric lens or misalignment of any of the components.

In one embodiment, the sight is powered by two batteries which are connected in series via a conductive end cap. The end cap may be cast of aluminum, or another conductive material, to provide a connection between the positive terminal of one of the batteries and the negative terminal in the other battery while at the same time securely encasing the batteries within the battery compartment of the sight.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 7 is an end cross-sectional view of a sight illustrating the elevation adjuster components;

FIG. 8 is a elevated perspective view of the battery cap;

FIG. 10 is an end cross-sectional view of the sight illustrating the windage adjuster components;

DETAILED DESCRIPTION OF THE PREFERRED EMBODIMENTS

Figure 1:
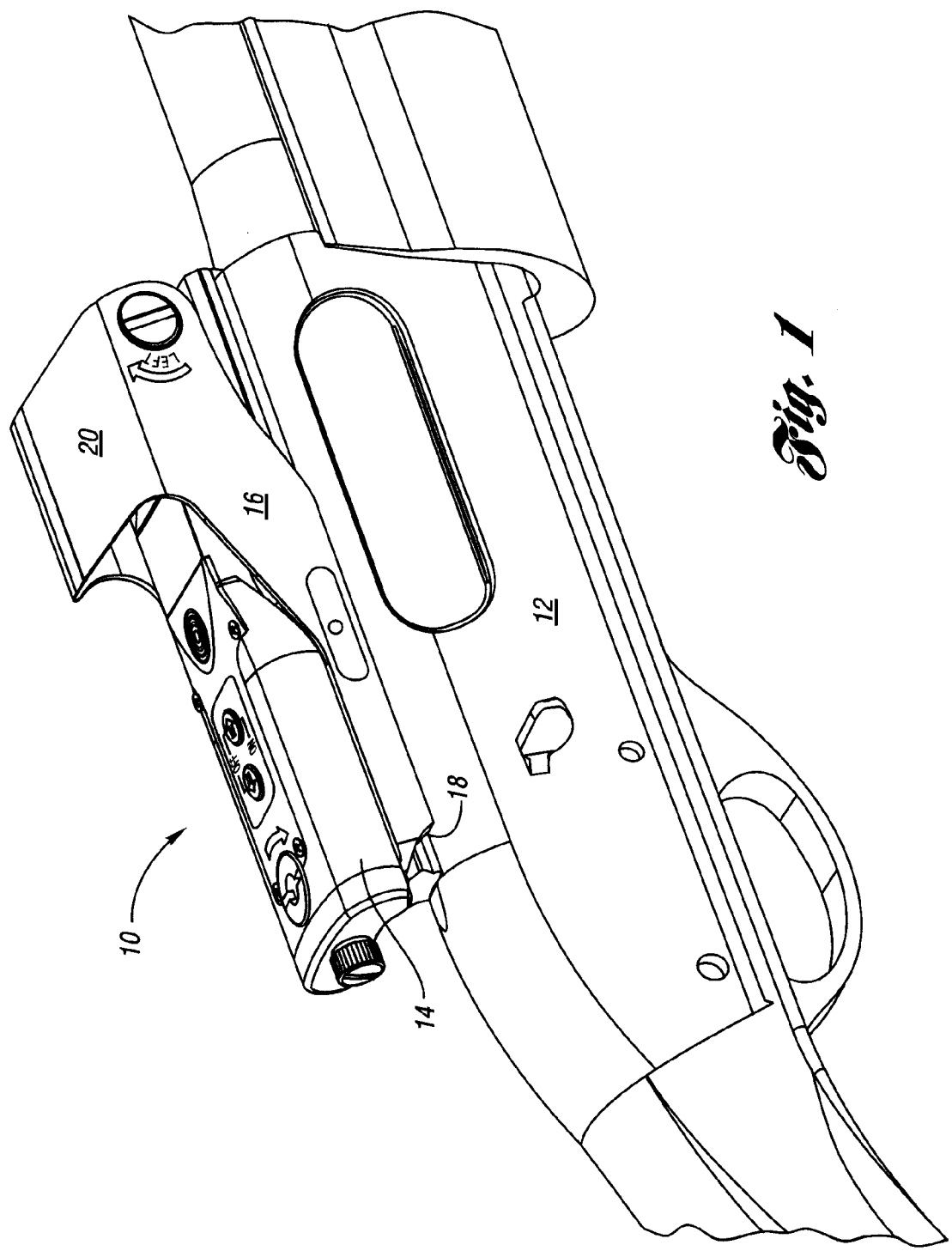
FIG. 1 is a plan perspective view of a holographic sight of the present invention mounted on a shotgun.

Referring to FIG. 1, one embodiment of the low profile holographic sight of the present invention, generally indicated by 10, is shown mounted on a shotgun 12, though it will be appreciated that the sight 10 may be similarly mounted for use on other arms, including, for example, rifles, relatively large handguns, and bows. This sight is, however, particularly suited for mounting and use with rifles and shotguns due to its low profile design. The sight 10 includes a body 14 which houses the laser diode, the diode control, the power source, and the optical components, and a base 16 upon which the body of the sight is secured and which, in turn, releasably secures the sight to the firearm. The base includes a mounting mechanism 18 for mounting the sight on the firearm with which the sight is to be used. Of course, various types of mounts may be employed as the mounting mechanism 18 on the sight 10 depending upon the type of weapon, including a standard shotgun mount, a Weaver® mount, a Mil-Std-1913 mount, or any of a variety commercially available mounts adapted for use with particular weapons.

The base 16 may also include a shroud 20 which extends over the optical grating to thereby protect the grating and shield the grating from ambient light.

Figure 2:
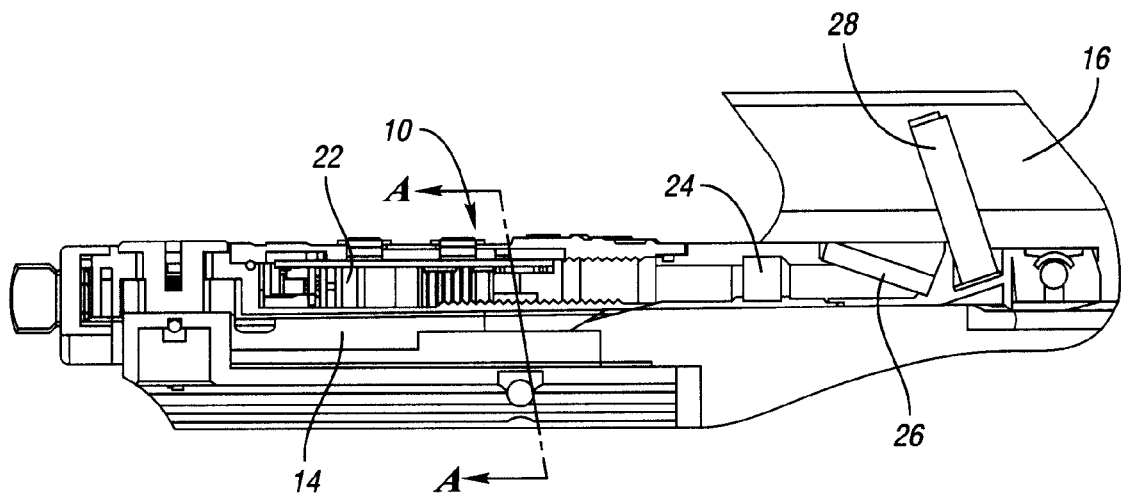
FIG. 2 is a side cross-sectional view of a holographic sight of the present invention.

Referring to FIG. 2, the illustrated embodiment of the sight 10 includes a laser diode 22, a beam collimator 24, a transmission image hologram 26, and a reflection grating 28. The optical components provide an image of a reticle pattern projected in the viewing area of the sight along an optical path wherein the light propagation is primarily in the horizontal direction.

Figure 3:
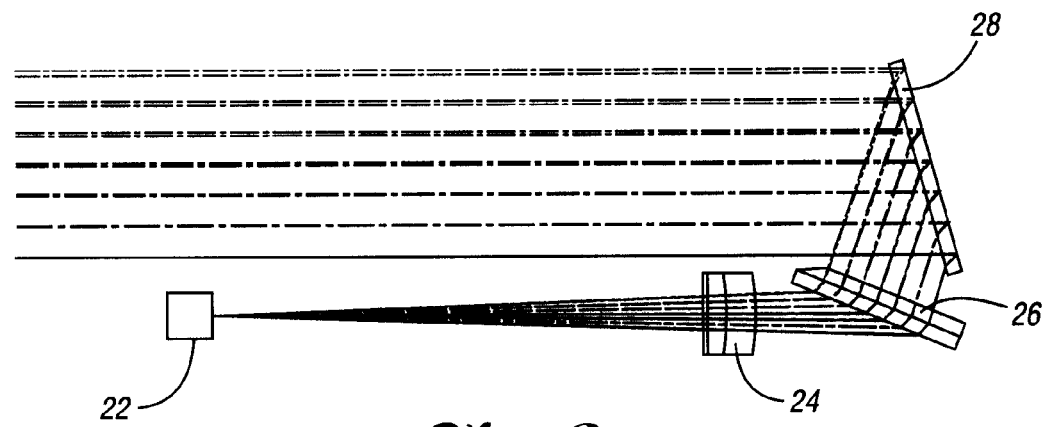
FIG. 3 is a schematic view of the layout of the optical components.

As shown in FIGS. 2 and 3, the diverging beam of the laser diode 22 is directed in a generally horizontal direction (that is, generally along the length of the sight body 14) through a beam collimator 24. In the illustrated embodiment, the beam collimator is a molded plastic aspheric collimating lens. It will be appreciated, however, that the collimating lens can be another lens type such as an achromatic or diffractive lens, or the optical power can be incorporated into the image hologram.

It should be noted that terms "vertical", "horizontal", "upward", and "downward", are used herein to describe locations and direction based upon an assumption that the holographic sight is mounted for use where the longitudinal axis of the base 16 and the path of the reticle pattern extend in a horizontal direction. Thus, while it is described that the optical path is folded such that the light propagation is primarily in the horizontal direction, it will be understood that, regardless of the orientation of the sight, that portion of the path referred herein as "horizontal" will always be substantially parallel to the longitudinal axis of the base, and similarly, substantially parallel to the path of the projected image of the reticle pattern.

In the illustrated embodiment, the collimator 24 produces a well collimated beam at 635 nanometers which is directed at the transmission image hologram 26 of the aiming reticle, forming a virtual image of the reticle that is normal to the hologram. The light diffracted by the transmission hologram 26 then impinges on a reflection grating 28. The light incident on the grating is diffracted and propagates parallel to the horizontal axis. In the illustrated embodiment, the reflection grating 28 is made in the form of a volume Bragg hologram which diffracts only a narrow band of light around 650 nanometers. All the other wavelengths of light can pass through with little attenuation. The grating 28 therefore acts as a beam combiner that superimposes the image of the reticle over the direct view of the target scene. The optics for the sight may, of course, be designed to operate with a beam of 650 nanometers, or other suitable beam wavelengths.

It will be appreciated that the sight of the present invention is an achromatic diffractive optical system. The sight of the present invention employs the passive wavelength compensation techniques disclosed in U.S. Pat. No. 5,483,362 to minimize and effectively eliminate the reticle pattern position shifts which would otherwise result from changes in the laser wavelength caused by temperature variations. The disclosure of U.S. Pat. No. 5,483,362 is hereby incorporated herein with respect to these wavelength compensation techniques.

Figure 4:
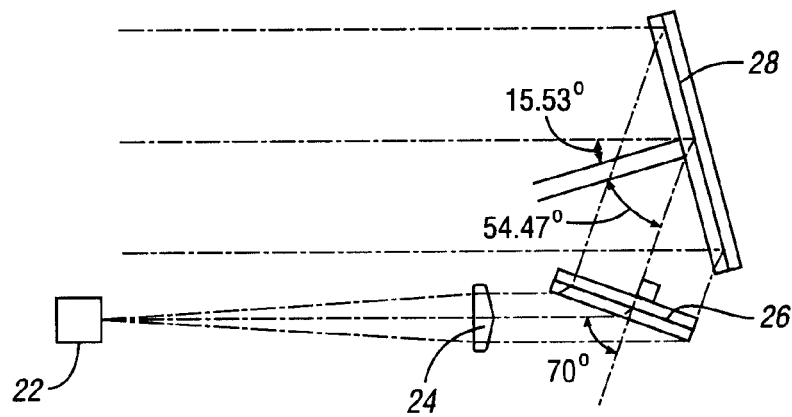
FIG. 4 is a schematic illustrating the orientation of the optical components in one embodiment of the invention.

FIG. 4 illustrates the orientation of the optical components in the embodiment of FIG. 1. The collimated beam illuminates and is diffracted by the hologram 26 recorded with the image of an aiming reticle. To make a sight having a low profile, the hologram is tilted sharply. The larger the tilt angle, the lower the sight profile. However, increasing the tilt angle of the hologram from vertical also increases the amount that the beam expands as well as increasing the amount of incident light reflected off of the glass surface of the transmission hologram. It is thus desirable to provide a tilt angle for the hologram that balances the desire for a low profile sight with an acceptable beam profile and reflection loss.

The transmission image hologram 26 is preferably tilted at an angle that is closer to horizontal than-vertical, that is, greater than 45° from the vertical axis.

In one implementation, the collimated laser beam illuminates the transmission hologram at 70°, is diffracted by the hologram, and exits the hologram at 90°. With this geometry, the light diffracted by the transmission hologram then impinges upon the reflection grating 28 at 54.47° and is diffracted back at 15.53° off the grating, which places the beam parallel to the optical axis. The dispersions due to diffraction by the transmission hologram and the reflection grating are identical but are in opposite directions. The output beam diffracted by the grating is parallel to the optical axis as defined by the collimated beam over a range of wavelengths within plus/minus 10 nm of the nominal laser emission wavelength of 635 nm. As taught in U.S. Pat. No. 5,483,362, the sight is achromatic in that the emission wavelength of the laser diode can drift by plus or minus 10 nm and the angular position of the holographic reticle image will remain essentially unchanged.

It will also be appreciated that other embodiments may employ optical elements oriented at various tilt angles and vertical displacements by varying the geometry and material (and, thereby, the refractive index) of one or more of the optical components to achieve the desired profile and achromatic operation.

Also, various reticle patterns, including three-dimensional patterns, can be recorded on the hologram, as desired.

In the embodiment illustrated in FIG. 1, the body 14 and base 16 are manufactured from aluminum. However, any resilient material, such as other cast metals, or more lightweight high impact molded plastic, may alternatively be used for these components. The transmission image hologram is fabricated from a glass holographic plate using known recording techniques. In the illustrated embodiment, the aspheric collimating lens is manufactured from Zeonex®, again using known techniques. This lens may alternatively be fabricated from other suitable optical materials, such as glass or acrylics. Similarly, the reflection grating is also a holographic grating made from glass holographic plate using known techniques. The laser diode utilized in the illustrated embodiment is a 5 mg watt, 635 nanometer laser diode.

In the illustrated embodiment, the power source is a pair of "AAA" size batteries, although any similarly compact power source may alternatively be employed.

Figure 5:
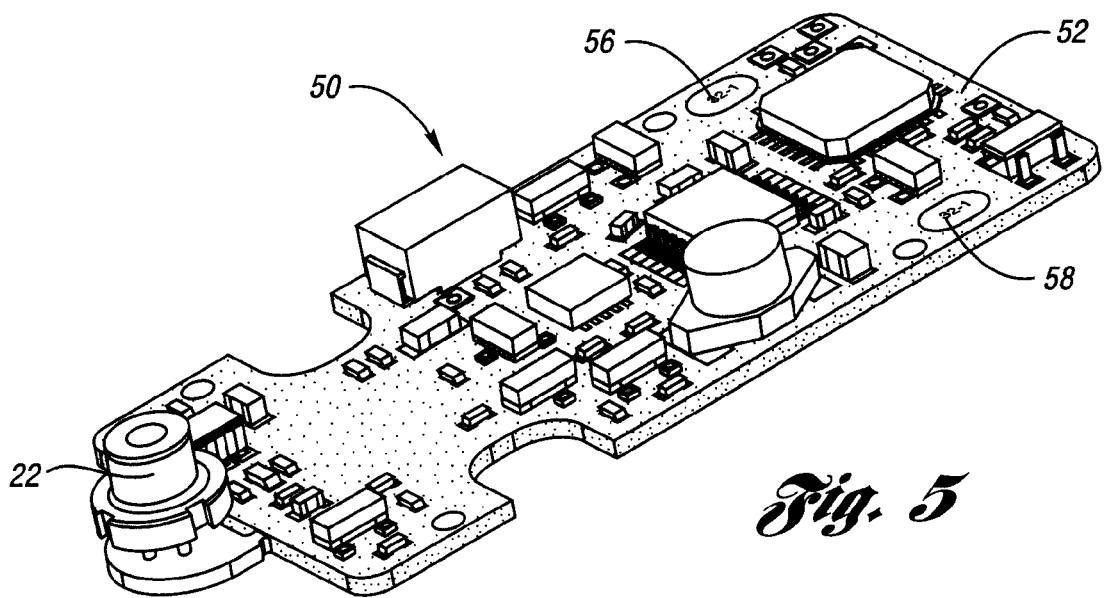
FIG. 5 is an elevated view of the laser diode and electronic control board assembly 50 prior to disconnection and mounting of the diode in position in the sight.
Figure 6:
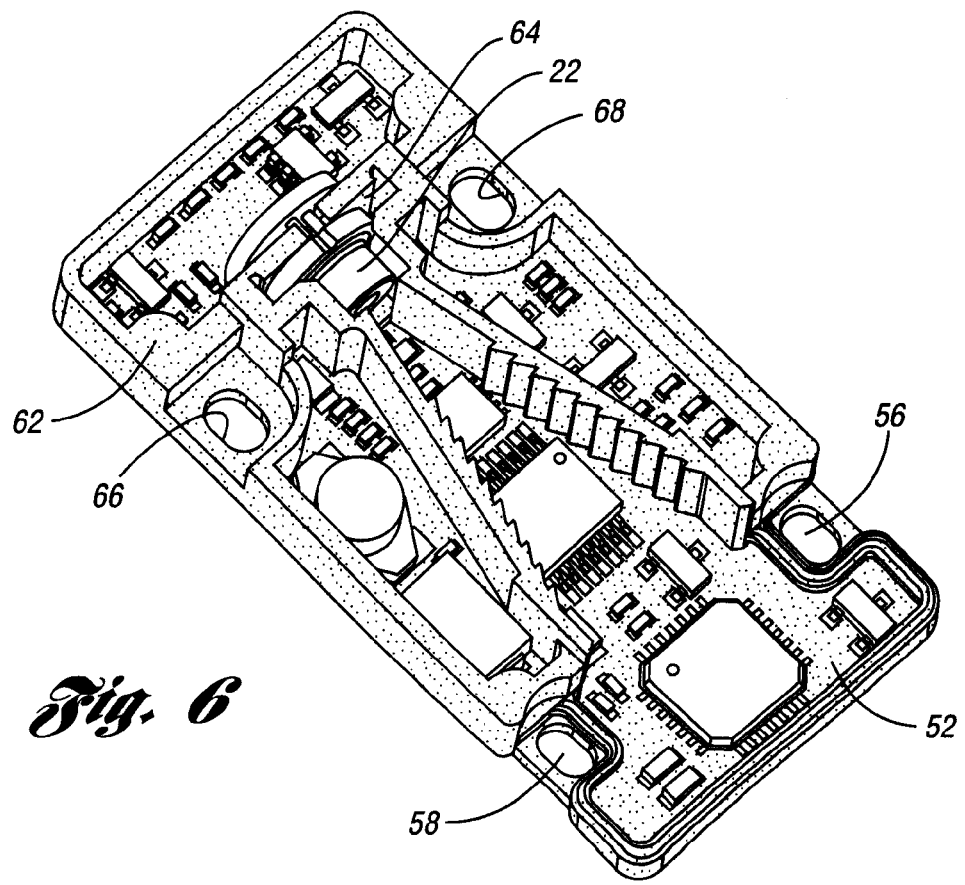
FIG. 6 is an elevation view of the laser diode, mounting frame, electronic control board, and tray.

Referring to FIGS. 5 and 6 the sight 20 also includes an electronic control for the laser diode 22. Following is a description of the control functions implemented on the laser diode control used in the illustrated embodiment of the present invention. The laser diode includes an integral photo diode, which is used for optical power output control. This photo diode is modulated by a micro-controller and associated pulse forming circuits.

The main function of the micro-controller is to generate the timing for the laser diode control. The laser diode is both pulse width modulated (PWM) and pulse frequency modulated (PFM) by the micro-controller. Switch inputs to the micro-controller provide user control of the sight, and a variety of micro-controller outputs provide the timing required to turn on the laser diode power regulation circuitry and control the pulse forming circuits.

The switch inputs control the on/off features, as well as the operating brightness of the laser diode. Once the user has turned on the sight, the micro-controller initiates a battery test, which is described below, then generates the appropriate timing signals to provide the proper PWM or PFM control of the circuits that drive the laser diode. The effective brightness of the laser diode is varied by changing the duty cycle of the signals that are applied to the laser diode.

The DC to DC converter boosts the battery voltage to a regulated DC voltage that powers all of the circuits in the sight electronics. The DC to DC converter is implemented with a single integrated circuit and associated passive components. A voltage comparator is included in this integrated circuit which configured is to provide low battery indication.

A MOSFET is connected to the battery inputs to provide reverse battery protection for the sight electronics.

One input to the comparator in the DC to DC converter is connected to a reference in the DC to DC converter and the other input is connected to a voltage divider which monitors the battery voltage. When the battery voltage falls below a predetermined level, the comparator output switches states. This output is connected to an input on the micro-controller.

The low battery test is performed only when the sight is turned on. The test consists of loading the output of the DC to DC converter with a resistor for 50 milliseconds, then checking the battery voltage via the comparator output. If the battery voltage is low, the micro-controller turns on the laser diode as normal, but then "flashes" the brightness by reducing the operating level 2 steps for ½ second and then returning the level to the normal setting for ½ second. This cycle is repeated 5 times.

The laser diode optical power output is regulated by a closed loop control circuit. When the laser diode is turned on by the micro-controller, either directly or via the pulse forming circuits, the photo diode that is integrated into the laser diode produces an output current that is proportional to the laser diode output power. This current is monitored by the laser diode power regulator circuit, and the current through the laser diode is controlled to limit it to 5 milliwatts. The shortest pulse that the micro-controller is capable of producing is 1 micro-second. To provide a wider range of brightness control, the laser diode must be driven with pulses as short as 25 nano-seconds. To meet this requirement, there are 2 pulse-forming circuits that, when driven by a 1 micro-second pulse from the micro-controller, produce a much shorter pulse. There are two of these circuits, one that produces a 25 nano-second pulse and one that produces a 300 nano-second pulse. To control the brightness and give the user a consistent change in brightness from level to level, the micro-controller generates a specific set of control signals that drive the laser diode either directly via micro-controller outputs or through the pulse forming circuits. For example, in the illustrated embodiment, pulse width modulation of the laser output is employed to provide brightness adjustment. This technique, described in U.S. Pat. No. 5,483,362, the relevant portions of which are hereby incorporated by reference herein, pulse modulates the laser output at a frequency higher than 60 Hz, and preferably about 100 Hz, so that the brightness may be varied, since the perceived brightness to the human observer is proportional to the pulse width, W. It will be appreciated that other methods may be employed to control brightness, including using a linear polarizer in the path of the beam with manual or electrical adjustment mechanism. This type of brightness adjustment is also more fully described in U.S. Pat. No. 5,483,362, the relevant portions of which are incorporated by reference herein.

The control 50 may, of course, provide other control functions for other desired features which are implemented electronically.

In the illustrated embodiment the electronic control is implemented as a series of hardware and firmware components which are mounted upon a generally flat printed and populated circuit board 52. A mounting frame 62 is affixed (by heat staking or other similar means of affixation) to the control board 52. The laser diode 22 and mounting board portion 54 are placed into a suitably shaped receptacle 64 in the mounting frame 62 and soldered in place. Potting compound is then used to protect the soldered components.

The other optical components are typically mounted in the body by first bonding the components in place with a UV curable adhesive, then using a UV curable tack glue to mount the grating. The grating is preferably the last mounted optical component. Its angle is modified to correct for any misalignment error stackup in the previously mounted components.

The control module in the illustrated embodiment is mounted on the body by attaching conventional threaded fasteners through a pair of suitably sized apertures 66, 68 (shown in FIG. 6). When first assembled, the module may be attached relatively loosely to the body 14. The apertures are relatively elongate in the direction of the path of the laser beam. Thus, the electronic module can be slidably positioned in the direction of the laser beam once all of the optical elements have been mounted on the body 14 to focus the reticle path. It should be noted that the power contacts 56, 58 for the control board 52 are similarly relatively elongate in the direction of the light beam, so that the contacts maintain their connection to the power source before, during and after the module is slidably positioned during the assembly and focusing steps.

Figure 9:
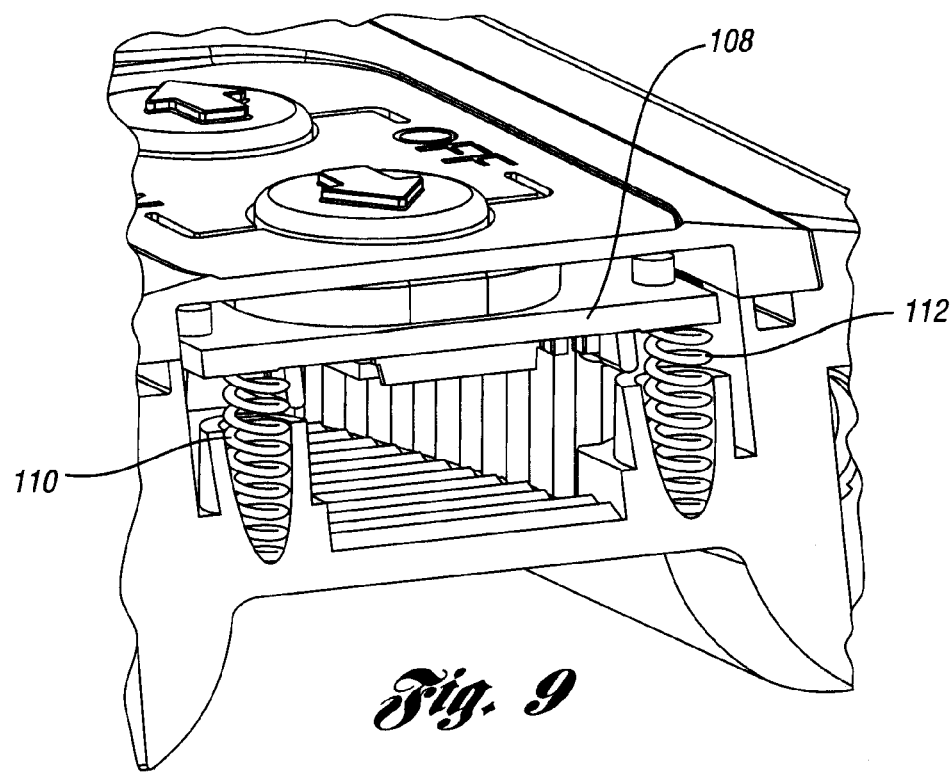
FIG. 9 is a partial cross-sectional view of the sight body, taken at A—A, showing the electrical connection of the power source to the laser control board.

The power source and means for connecting the source are illustrated in FIGS. 7–9. In the illustrated embodiment, the power source 70 comprise two "AAA" type batteries, which are mounted within the body 14 as shown. The power source 70 is connected to the laser diode 22 via the contacts 56, 58 on the board 52 by contact elements, which in the illustrated embodiment, comprise two tin-plated springs 110, 112. As previously described, these springs maintain connection to the power source be sliding contact with the elongate contacts 56, 58 during the focusing of the laser diode when the sight is assembled.

The positive terminal of one of the batteries 70 is connected to the negative terminal of the other of the batteries 72 via a conductive cap 80. This cap may be made of any conductive material, such as a cast aluminum, magnesium, or other conductive metal, and the exterior is preferably painted to prevent corrosion. The conductive cap eliminates the need for a separate stamped contact and provides a more durable and secure cover for the battery compartment. In the illustrated embodiment the cap is attached via a simple thumb screw which is retained with an e-clip. The screw is threaded into a pressed-in steel insert, which would allow for servicing in the field in the event the insert is stripped.

FIGS. 7 and 10 illustrate, respectively, the elevation and windage adjustment mechanisms of the present invention. In the illustrated embodiment, the reticle pattern may be adjusted for range (elevation) and windage (azimuth) by incorporating adjusters which rotate the entire body 14 of the sight relative to the base 16. Elevation adjuster 78 moves the body vertically upward or downward relative to the base 16 at the point shown in FIG. 7. The body is mounted for rotation on a generally horizontal axis (shown as 96 in FIG. 10). In the illustrated embodiment, the elevation adjuster comprises a tapered boss 82 which fits into an aperture in the body 14 suitably sized to allow for rotation of the boss within the aperture with little slop. The boss 82 is threadably received on an elevation shaft 84. A cross pin 86 traps the end of the boss against the base 16. Two elevation springs 74 and 76 which urge the body 14 upward against the boss 82, maintaining the boss 82, the shaft 84, and the pin 86 under tension. As the head of the boss is rotated, the body 14 is pulled toward or away from the base 16, pivoting the body 14 on the pivoting shaft 96. The pin 86 is trapped in the base 16 in a slot to prevent rotation of the threaded elevation shaft 84. In the illustrated embodiment, a spring and ball detent (not shown) of the type shown of the type shown as element 106, is provided to provide a slight detent at each 12° (i.e., 30 clicks per revolution of the boss) of rotation of the boss. The pitch of the threads is 32 threads/inch to allow for a vertical adjustment of about ½ minute of angle for each 12° rotation of the boss. Of course, it will be appreciated that greater or lesser precision of adjustment can be obtained by varying the number of detents on the head of the boss and/or the pitch of the thread on the boss and elevation shaft as desired.

The vertical travel of the boss 82 and the body 14 is limited in the upward direction by the head of the elevation shaft 88, and in the downward by the contact of the body 14 against the base 16.

In the illustrated embodiment, the pivoting axis 96 for the elevation adjuster also serves as the adjuster shaft for the windage adjuster, and, concomitantly, the pivoting axis for the windage adjuster 86 serves as the elevation shaft for the elevation adjuster. Thus dual purpose design reduces the number of parts and simplifies the assembly and operation of the sight.

The windage adjuster 90 utilized in the illustrated embodiment is depicted in FIG. 10. The windage adjuster 90 comprises a tapered metal boss 92, again mounted for rotation within the body 14. The boss 92 is seated into the body 14 via a flat leaf spring 94 which is located between the body 14 and the base 16. The boss 92 threadably receives a windage adjustment shaft 96 which is mounted in a horizontal orientation on the base 16. The windage adjustment shaft 96 extends through the base 16, through the body 14, and again through the base 16 where it is connected through a counterbored nut 98 which is locked with a set screw 100. A compression spring 102 urges the body 14 in one direction horizontally relative to the base 16. Rotation of the windage adjustment shaft 96 using, for example, a coin or other tool on the slotted head 104 of the shaft 96, rotates the shaft and pulls the boss toward or away from the head 104, thereby pivoting the body 14 relative to its vertical pivot axis (shown as 84 in FIG. 7) thereby providing windage adjustment as desired. The shaft is prevented from rotation during recoil by a steel ball and spring detent 106. The detent 106 contacts suitably placed grooves in the head 104 of the adjuster shaft to provide the user a "clicking" sound as the shaft is rotated to adjust for windage. In the illustrated embodiment, the head 104 of the shaft is provided with depressions suitable to provide a click at each half minute of angle of rotation of the head.

Figure 11:
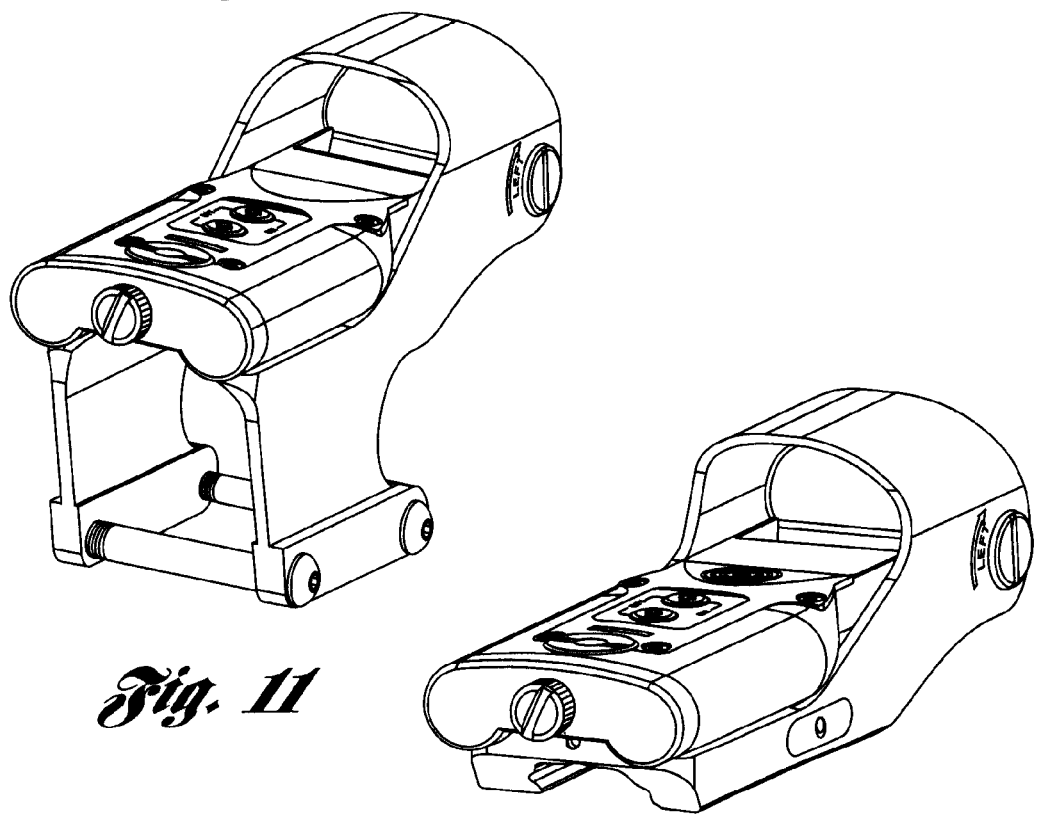
FIG. 11 is a plan perspective view of one embodiment of the invention wherein the base includes a conventional rifle mount.
Figure 12:
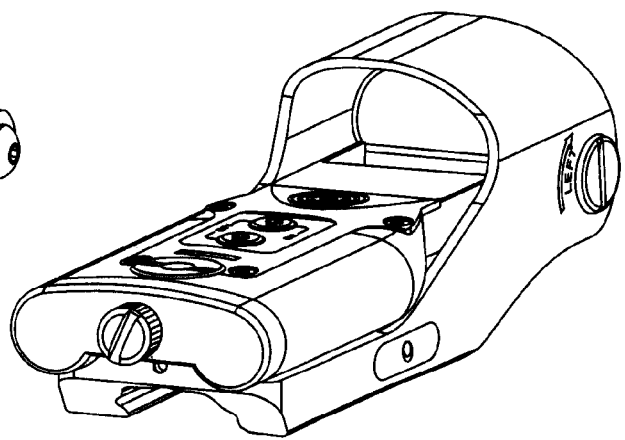
FIG. 12 is an elevation view of another embodiment of the present invention wherein the base includes a Weaver® style mount.

FIGS. 10 and 11 illustrate, respectively, sights incorporating bases 18 having a standard shotgun mount and a Weaver-type mount. It will be appreciated that, by incorporating the power, the laser diode, the diode control, and all of the optical elements in the body 14, that the holographic sight of the present invention can be adapted for bases having any desired mount. In addition, the body 14 could be mounted within a frame that is integral to any suitably designed firearm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A holographic sight comprising:
    a base including a mounting mechanism; and
    a body attached to the base, the body containing,
        a laser diode emitting a light beam of visible wavelength,
        optical elements including, a collimator mounted in the path of the beam to collimate the beam and direct the beam to a transmission hologram of a reticle pattern mounted in the path of the beam to diffract the beam, forming a virtual image of the reticle pattern, and a reflective diffraction grating mounted in the path of the diffracted beam to diffract and propagate the beam from the hologram along a path parallel to the horizontal axis, and
        a power source operably connected to the laser diode.

2. The holographic sight of claim 1 wherein the transmission image hologram is tilted sharply from the vertical axis to reduce the vertical height of the sight.

3. The holographic sight of claim 1 wherein the transmission image hologram is tilted about 70° from the vertical axis to reduce the vertical height of the sight as much as possible and still provide an acceptable beam profile and reflection loss.

4. The holographic sight of claim 1 wherein the dispersions due to diffraction by the transmission image hologram and the reflection grating are identical but are in opposite directions such that the angle of the beam reflected from the diffractor grating remains unchanged despite changes in the laser emission wavelength.

5. The holographic sight of claim 1 wherein the transmission hologram is mounted at an angle of 70° from the vertical axis, and the reflective diffraction grating is mounted at an angle of 54.47° from the vertical axis.

6. The holographic sight of claim 1 further including an adjustment mechanism for adjusting the path of the beam directed from the hologram to the target, the adjustment mechanism comprising a first adjuster for pivotally displacing the body relative to the base about a first rotational axis, and a second adjuster for pivotally displacing the body about a second rotational axis orthogonal to the first rotational axis, whereby the reticle pattern can be adjusted for windage and elevation, and wherein the second adjuster serves as the first rotational axis and the first adjuster serves as the second rotational axis.

7. The holographic sight of claim 1 wherein the power source comprises two batteries mounted in a battery compartment within the body, and further including a conductive cap which covers the batteries within the compartment and which contacts each of the batteries to electrically connect the batteries in series.

8. The holographic sight of claim 1 further including an electronic laser diode control including a circuit board, a mounting frame attached to the circuit board, and upon which the laser diode is mounted and operably connected to the circuit board, and wherein the mounting frame includes at least one elongated aperture for receiving a threaded fastener for adjustably mounting the laser diode and electronic control board to the body of the sight, and the circuit board includes a pair of elongated conductive pads for receiving a pair of conductive elements which connect each conductive pads to the power source, the elongated aperture and elongated pads each being elongate in the direction of the path of the laser beam so that the pad maintains connection to the power source before, during and after the laser and control board are slidably positioned during assembly of the sight.

9. The holographic sight of claim 8 wherein the at least one elongated aperture comprises two apertures located on opposing sides of the circuit board, and wherein the two elongated conductive pads are located on opposite sides of the circuit board.

10. The holographic sight of claim 1 wherein the transmission image hologram is tilted at an angle of greater than 45° from the vertical axis.

11. A holographic sight comprising:
   a base including a mounting mechanism;
   a housing mounted on the base, the housing containing,
      a laser diode emitting a light beam of visible wavelength,
      optical elements mounted in the path of the beam for directing a holographic image of a reticle pattern along a path toward the target, and
      a power source operably connected to the laser diode; and
   an adjustment mechanism for adjusting the path of the beam directed from the hologram to the target, the adjustment mechanism comprising a first adjuster comprising a first shaft along which the housing is displaced relative to the base about a first rotational axis, and a second adjuster comprising a second shaft along which the housing is displaced relative to the base about a second rotational axis orthogonal to the first rotational axis, whereby the reticle pattern can be adjusted for windage and elevation, and wherein the second shaft is the first rotational axis and the first shaft is the second rotational axis.

* * * * *